(12) United States Patent
Nicklos et al.

(10) Patent No.: US 10,350,924 B2
(45) Date of Patent: Jul. 16, 2019

(54) SENSOR APPARATUS

(71) Applicant: HEWLETT-PACKARD DEVELOPMENT COMPANY, L.P., Houston, TX (US)

(72) Inventors: Carl Nicklos, Washougal, WA (US); John B. Engel, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,040

(22) PCT Filed: Oct. 30, 2015

(86) PCT No.: PCT/US2015/058219
§ 371 (c)(1),
(2) Date: Jan. 26, 2018

(87) PCT Pub. No.: WO2017/074412
PCT Pub. Date: May 4, 2017

(65) Prior Publication Data
US 2018/0250969 A1    Sep. 6, 2018

(51) Int. Cl.
*B41J 13/10* (2006.01)
*B41J 2/38* (2006.01)
*B41J 29/38* (2006.01)
*G01V 8/12* (2006.01)
(Continued)

(52) U.S. Cl.
CPC ............. *B41J 29/38* (2013.01); *B41J 13/106* (2013.01); *B65H 31/02* (2013.01); *B65H 43/06* (2013.01); *G01V 8/12* (2013.01); *B65H 2301/4212* (2013.01); *B65H 2402/45* (2013.01); *B65H 2511/152* (2013.01); *B65H 2511/214* (2013.01); *B65H 2511/515* (2013.01); *B65H 2553/612* (2013.01); *B65H 2801/06* (2013.01)

(58) Field of Classification Search
CPC .................................. B41J 13/106; B41J 2/38
See application file for complete search history.

(56) References Cited

U.S. PATENT DOCUMENTS

| 5,033,731 A | 7/1991 | Looney |
| 5,328,169 A | 7/1994 | Mandel |
| 5,823,529 A | 10/1998 | Mandel et al. |

(Continued)

FOREIGN PATENT DOCUMENTS

| CN | 1199013 | 11/1998 |
| CN | 1636751 | 7/2005 |

(Continued)

OTHER PUBLICATIONS

"PrinterService 32 Mailbox Service Guide"; Jan. 6, 1997; http://manx.classiccmp.org/collections/mds-199909/cd3/printer/prt32sga.pdf.

*Primary Examiner* — Jason S Uhlenhake
(74) *Attorney, Agent, or Firm* — HP Inc. Patent Department

(57) ABSTRACT

In one example, an apparatus includes a sensor including an emitter and a detector that define a line of sight therebetween. A mechanical arm has a fixed end and a free end. An axis of rotation passing through the fixed end of the mechanical arm is parallel to the line of sight. A mechanical flag mounted to the fixed end of the mechanical arm includes at least a first protrusion that defines at least three positions of the mechanical arm relative to the line of sight.

13 Claims, 13 Drawing Sheets

(51) Int. Cl.
*B65H 31/02* (2006.01)
*B65H 43/06* (2006.01)

(56) References Cited

U.S. PATENT DOCUMENTS

| | | |
|---|---|---|
| 5,961,115 A | 10/1999 | Blanck et al. |
| 5,963,754 A | 10/1999 | Itoh et al. |
| 7,717,421 B2 | 5/2010 | Rennick et al. |
| 8,752,829 B1 | 6/2014 | Uehling |
| 8,849,145 B2 | 9/2014 | Hashimoto et al. |
| 2005/0053404 A1 | 3/2005 | Zeller et al. |
| 2005/0141939 A1 | 6/2005 | Kayakma et al. |
| 2006/0180999 A1 | 8/2006 | Suzuki et al. |
| 2010/0025924 A1* | 2/2010 | Rennick ................ B65H 31/02 271/207 |

FOREIGN PATENT DOCUMENTS

| | | |
|---|---|---|
| CN | 1962383 | 5/2007 |
| JP | 2002167119 | 6/2002 |
| JP | 200567831 | 3/2005 |

* cited by examiner

SENSOR APPARATUS

BACKGROUND

Various conditions may prevent a printing device from printing properly. For instance, if the output door of the printing device is blocked, or if the output bin of the printing device is full, the printing device may not be able to print.

DETAILED DESCRIPTION

Figure 1A:
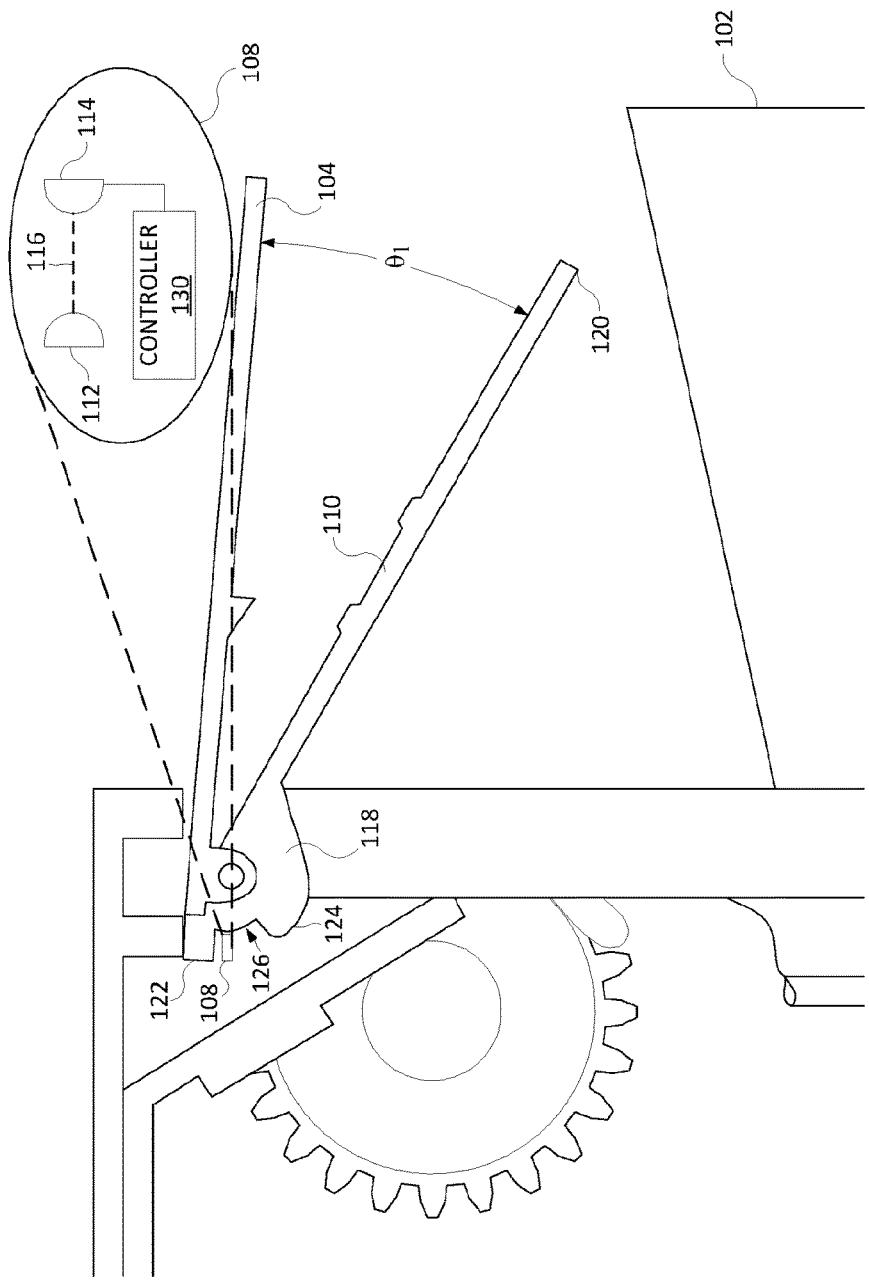
FIGS. 1A-1C illustrate a first example of a portion of a printing device that incorporates a sensor assembly for detecting when the output bin of the printing device is full and also when the output door of the printing device is closed.

In one example, the present disclosure describes a sensor assembly that detects when the output bin of a printing device is full and also when the output door of the printing device is closed. Either or both of these conditions may prevent the printing device from printing properly. Adding functionality to sense both of these conditions, however, is challenging given the space, cost, and electronic constraints of printing devices.

The present disclosure describes a sensor assembly that detects when the output bin of a printing device is full and also when the output door of the printing device is blocked. The compact assembly includes a sensor that is mounted inside the printing device, near the output door, and has a line of sight that is substantially parallel to the output door's axis of rotation. The assembly also includes a mechanical arm mounted beneath the output door and having a fixed end and a free end. The mechanical arm's axis of rotation passes through the fixed end and is parallel to the output door's axis of rotation. The fixed end includes a mechanical flag. In a first example, the mechanical flag includes a first protrusion or tine and a second protrusion or tine that form a gap or window therebetween. In this example, when the output door is open and the output bin is not full, the mechanical arm rotates to a position that aligns the window with the sensor's line of sight, such that the sensor's line of sight is unobstructed. However, when the output door is closed, the mechanical arm rotates to a position that aligns the first protrusion with the sensor's line of sight, thereby obstructing the line of sight. Similarly, when the output door is open and the output bin is full enough for the paper stack to contact the mechanical arm, the paper stack urges the mechanical arm to rotate to a positon that aligns the second protrusion with the sensor's line of sight, thereby obstructing the line of sight.

In a second example, the mechanical flag includes a single or first protrusion or tine. In this example, when the output door is open and the output bin is not full, the mechanical arm rotates to a position that aligns the protrusion with the sensor's line of sight, such that the sensor's line of sight is obstructed. However, when the output door is closed, the mechanical arm rotates to a position that positions the first protrusion above the sensor's line of sight, such that the line of sight is unobstructed. Similarly, when the output door is open and the output bin is full enough for the paper stack to contact the mechanical arm, the paper stack urges the mechanical arm to rotate to a positon that positions the protrusion below the sensor's line of sight, such that the line of sight is unobstructed.

In both examples, the state of the emitter signal that is detected by the detector indicates whether the output door is blocked, whether the output bin is full, or whether neither of these conditions exists. The state of the signal may be detected as "high" or "low," or simply "detected" or "undetected." The state of the signal, as detected by the detector, is affected by whether the line of sight between the emitter and the detector is obstructed or unobstructed. In the first example, an unobstructed line of sight or a high or detected signal indicates that the output door is open and the output bin is not full. Conversely, an obstructed line of sight or a low or undetected signal indicates that the output door is blocked and/or the output bin is full. In the second example, the consequences of the state of the signal are reversed. That is, an obstructed line of sight or a low or undetected signal indicates that the output door is open and the output bin is not full. Conversely, an unobstructed line of sight or a high or detected signal indicates that the output door is blocked and/or the output bin is full.

Figure 1B:
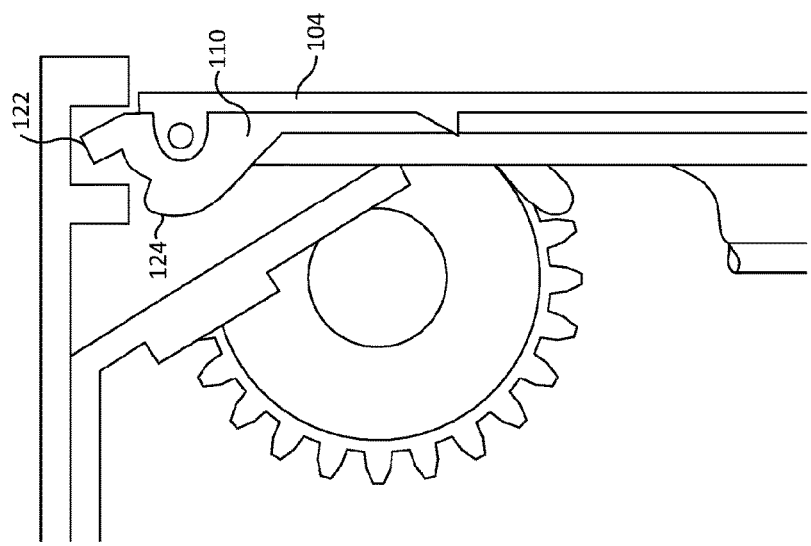
Figure 1C:
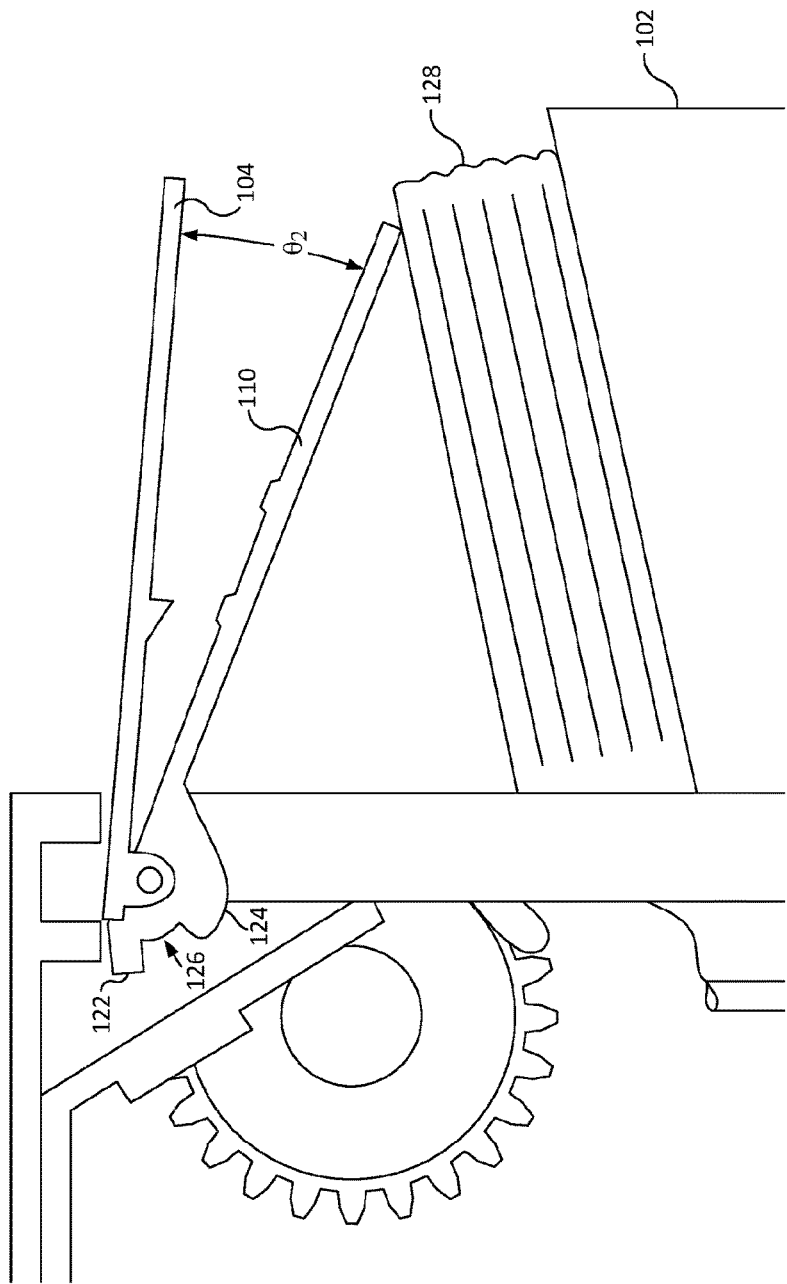

FIGS. 1A-1C illustrate a first example of a portion of a printing device 100 that incorporates a sensor assembly for detecting when the output bin of the printing device 100 is full and also when the output door of the printing device 100 is closed. In particular, FIG. 1A illustrates the printing device 100 when the output door is open and the output bin is not full; FIG. 1B illustrates the printing device 100 when the output door is blocked, and FIG. 1C illustrates the printing device 100 when the output bin is full. The figures illustrate portions of the printing device 100 that are relevant to an understanding of the present disclosure and are not meant to depict the printing device 100 in full.

As illustrated in FIG. 1A, the printing device 100 includes an output bin 102 and output door 104. The output bin 102 is mounted to the exterior of the printing device 100 and is positioned to catch paper as it exits the printing device 100. The output door 104 is hinged upon a first axis of rotation that is substantially perpendicular to the direction in which paper exits the printing device 100, e.g., normal to the plane of FIG. 1A. The output door 104 may have a planar shape. When the printing device 100 is instructed to deliver a print job to the output bin 102, the output door 104 opens to allow the paper to exit the printing device 100 and accumulate in the output bin 102. The output door 104 may close once the print job is complete. However, as discussed above, the output door 104 may be blocked, e.g., due to an obstruction or mechanical failure, or the output bin 102 may be full, e.g., due to an accumulation of previous printing jobs. Either of these conditions can prevent the print job from printing properly.

To detect these conditions, in one example a single sensor 108 is deployed in conjunction with a mechanical arm 110. The sensor 108 is mounted within the interior of the printing device 100, near the axis of rotation of the output door 104. The sensor 108 includes an emitter 112 and a detector 114 that define a line of sight 116 therebetween. In one example, the line of sight 116 is substantially parallel to and is as long as at least a portion of the first axis of rotation. For instance, the emitter 112 may be positioned on one side of the output door, while the detector 114 is positioned on the other side of the output door.

The mechanical arm 110 has a fixed end 118 and a free end 120. The fixed end 118 is hinged about a second axis of rotation that is substantially parallel to the first axis of rotation and to the sensor's line of sight 116. In one example, the second axis of rotation and the first axis of rotation are collinear, e.g., such that the output door 104 and the mechanical arm 110 are hinged about the same axis.

Figure 2:
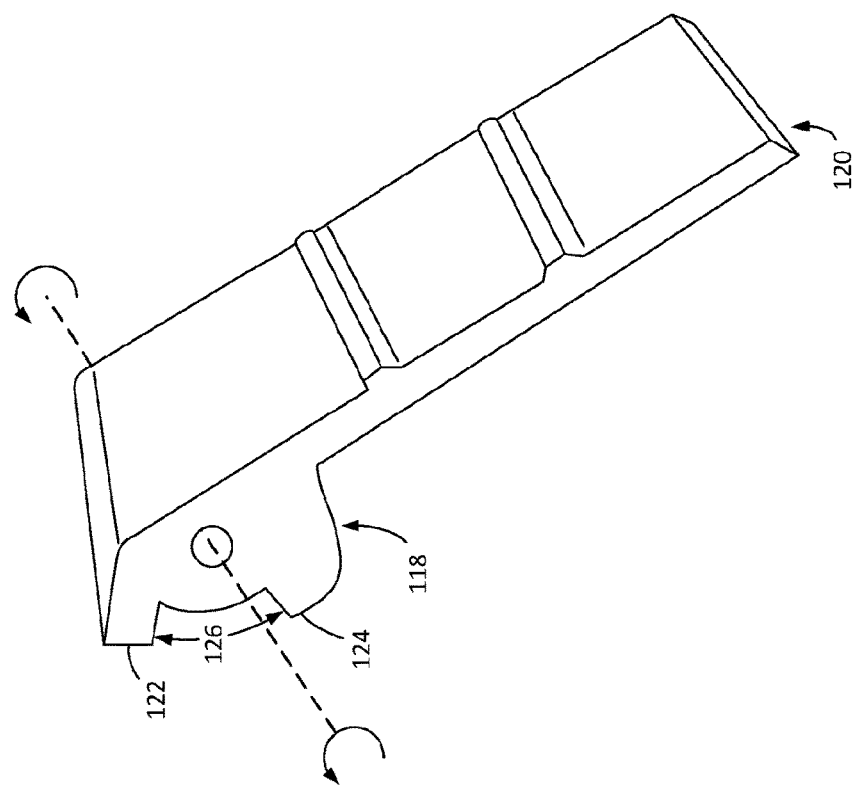
FIG. 2 illustrates the example mechanical arm of FIGS. 1A-1C in more detail.

FIG. 2 illustrates the mechanical arm 110 of FIGS. 1A-1C in more detail. As illustrated, the mechanical arm 110 may have a substantially planar shape, e.g., similar to the output door 104 but smaller. Thus, the mechanical arm 110 may be configured as a flap that is mounted between the output door 104 and the output bin 102. The fixed end 118 of the mechanical arm 110 includes a mechanical flag. The mechanical flag is collectively formed by a first protrusion 122 and a second protrusion 124 that define a gap or window 126 therebetween.

Referring back to FIG. 1A, the mechanical arm 110 is mounted so that the first protrusion 122 extends beyond the plane of the output door 104. When the output door 104 is open and the output bin 102 is not full, i.e., the accumulation of paper in the output bin is less than the output bin's maximum capacity, the mechanical arm 110 rotates to a position that aligns the window 126 with the sensor's line of sight 116, such that the sensor's line of sight 116 is unobstructed. Thus, the detector 114 is able to detect signals emitted by the emitter 112. In this example, a "signal" may be defined as an indicator that is different from an expected indicator. For instance, an active signal (or a "high" signal) from the emitter 112 may be expected, but a lack of active signal (or a "low" signal) may also be considered as an indicator of a different type. As illustrated in FIG. 1A, an angle of $\theta_1$ exists between the output door 104 and the mechanical arm 110 in this case. In one example, due to the shape and position of the first protrusion 122 on the mechanical flag, the angle between the output door 104 and the mechanical arm 110 cannot be greater than el. Thus, although gravity will cause the mechanical arm 110 to rotate downward, e.g., in a clockwise direction in FIG. 1A, this downward rotation will stop when the first protrusion 122 bumps up against the underside of the output door 104.

FIG. 1B illustrates what happens when the output door 104 is blocked or closed. In this case, the closing of the output door 104 urges the mechanical arm 110 to rotate to a position that aligns the second protrusion 124 of the mechanical flag with the sensor's line of sight 116. For instance, as illustrated in FIG. 1B, the second protrusion 124 blocks the sensor 108, which is no longer visible in FIG. 1B. Thus, the detector 114 is unable to detect signals emitted by the emitter 112.

FIG. 1C illustrates what happens when the output bin 102 is full, i.e., when the accumulation of paper in the output bin is greater than or equal to the output bin's maximum capacity. In this case, the paper stack 128, i.e., the accumulation of completed or partially completed print jobs, in the output bin 102 urges the mechanical arm 110 to rotate to a position that aligns the first protrusion 122 of the mechanical flag with the sensor's line of sight 116. For instance, as illustrated in FIG. 1C, the first protrusion 122 blocks the sensor 108, which is no longer visible in FIG. 1C. Thus, the detector 114 is unable to detect signals emitted by the emitter 112. As illustrated in FIG. 1C, an angle of $\theta_2$, which is smaller than the angle of $\theta_1$ in FIG. 1A, exists between the output door 104 and the mechanical arm 110 in this case, as a result of the paper stack 128 contacting the mechanical arm 110 and urging the mechanical arm 110 upward.

Figure 3:
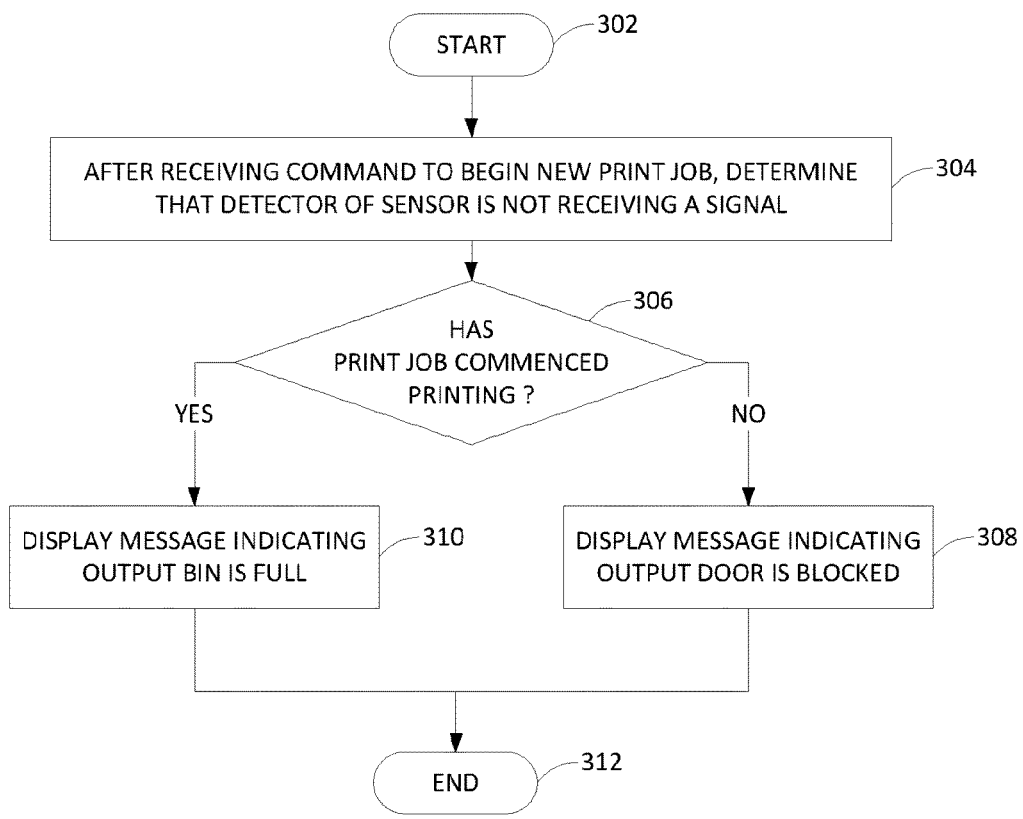
FIG. 3 illustrates a flowchart of one example method for detecting when the output bin of a printing device is full or when the output door of the printing device is closed.

FIG. 3 illustrates a flowchart of one example method 300 for detecting when the output bin of a printing device is full or when the output door of the printing device is closed. The method 300 may be performed, for example, by the controller 130 of the printing device 100 of FIGS. 1A-1C. Otherwise, or in addition, at least one of the blocks of the method 300 may be implemented by a computing device having a processor, a memory, and input/output devices as illustrated below in FIG. 5, specifically programmed to perform the blocks of the method, e.g., by operating as a control circuit for the printing device 100. Although a computing device may be specifically programmed to perform various blocks of the method 300, the method will now be described in terms of an example where blocks of the method are performed by a controller of a printing device, such as the printing device controller 130 in FIGS. 1A-1C. As such, non-limiting reference is made in the discussion of the method 300 to various components of FIGS. 1A-1C.

The method 300 begins in block 302. In block 304, after receiving a command to begin a new print job, the printing device controller 130 determines that the detector 114 of the sensor 108 is not receiving a signal from the emitter 112.

In block 306, the printing device controller 130 determines whether the print job has commenced printing. If the print job has not yet commenced printing, then the printing device controller 130 concludes that the output door 104 is blocked. The printing device controller 130 then displays a message indicating that the output door 104 is blocked in block 308.

Otherwise, if the print job has commenced printing, then the printing device controller 130 concludes that the output bin 102 is full. The printing device controller 130 then displays a message indicating that the output bin 102 is full in block 310. The method 300 ends in block 312.

Thus, the method 300 is able to determine, using a single sensor 108 in conjunction with the mechanical arm 110, when the output door 104 is blocked and also when the output bin 102 is full. That is, both conditions can be detected using the same sensor, rather than relying on separate sensors to detect each condition. This minimizes the number of components that are installed inside the printing device 100, where space may be very limited.

Figure 4:
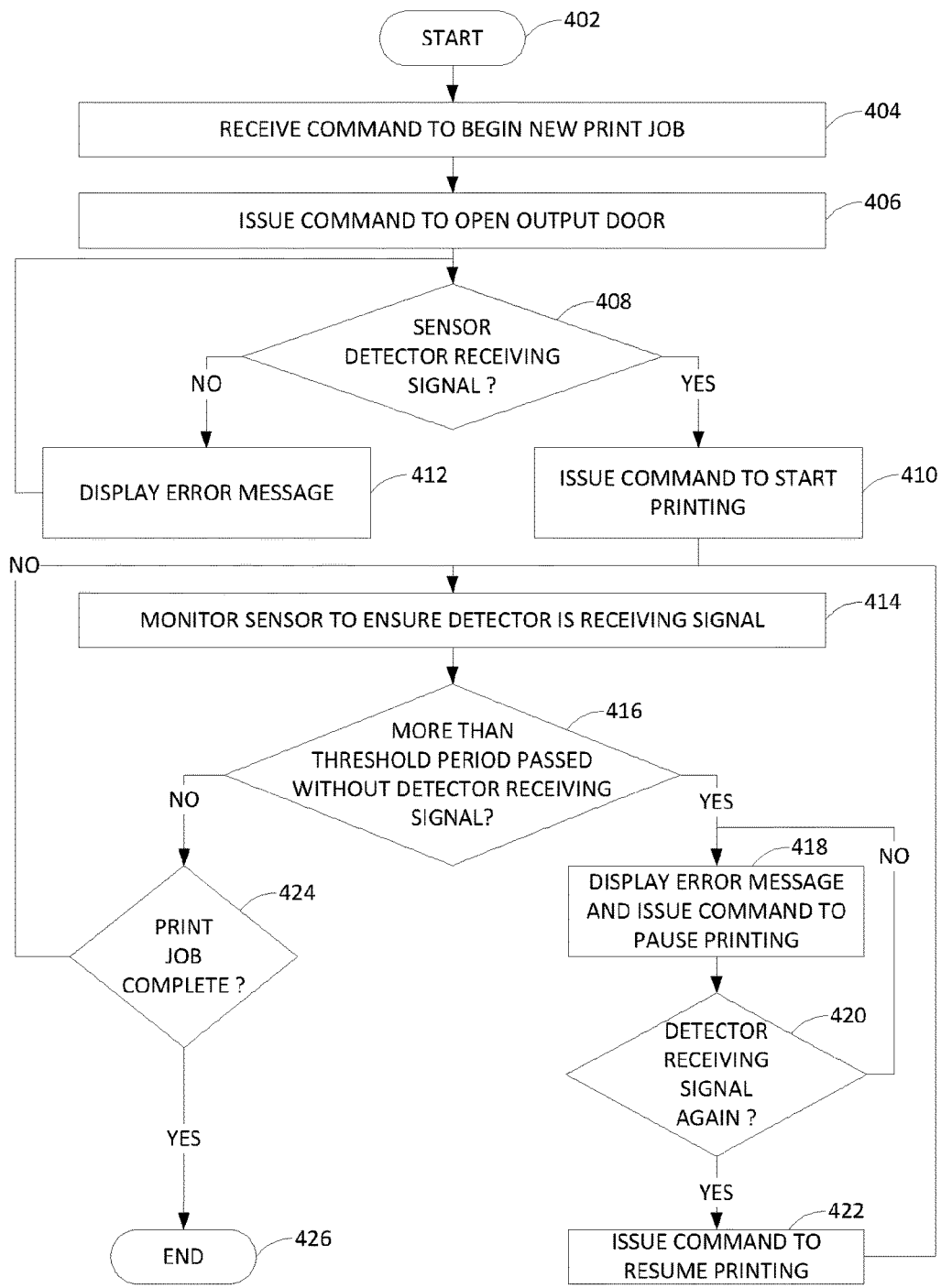
FIG. 4 illustrates a flowchart of another example method for detecting when the output bin of a printing device is full or when the output door of the printing device is closed.

FIG. 4 illustrates a flowchart of another example method 400 for detecting when the output bin of a printing device is full or when the output door of the printing device is closed. The method 400 is a more detailed version of the method 300 illustrated in FIG. 3. The method 400 may be performed, for example, by the controller of the printing device 100 of FIGS. 1A-1C. Otherwise, or in addition, at least one of the blocks of the method 400 may be implemented by a computing device having a processor, a memory, and input/ output devices as illustrated below in FIG. 5, specifically programmed to perform the blocks of the method, e.g., by operating as a control circuit for the printing device 100. Although a computing device may be specifically programmed to perform various blocks of the method 400, the method will now be described in terms of an example where blocks of the method are performed by a controller of a printing device, such as the printing device controller 130 in FIGS. 1A-1C. As such, non-limiting reference is made in the discussion of the method 400 to various components of FIGS. 1A-1C.

The method 400 begins in block 402. In block 404, the printing device controller 130 receives a command, e.g., from a user, to begin a new printing job. Prior to receiving this command, the output door 104 of the printing device 100 may have been closed due to the printing device being idle. In this case, the detector 114 of the sensor 108 would not be receiving a signal from the emitter 112.

In block 406, the printing device controller 130 issues a command to open the output door 104.

In block 408, the printing device controller 130 confirms that the detector 114 of the sensor 108 is receiving a signal from the emitter 112. If the detector 114 is receiving the signal from the emitter 112, then this indicates that the output door 104 is open. Thus, if the printing device controller 130 concludes in block 408 that the detector 114 is receiving a signal, then the printing device controller 130 issues a command to start the printing in block 410.

However, if the printing device controller 130 concludes in block 408 that the detector 114 is not receiving a signal, then in block 412, the printing device controller 130 displays an error message to the user, e.g., on a display of the printing device. The inability of the detector 114 to receive the signal can mean that either the output door 104 is blocked or that the output door 104 is open, but the output bin 102 is full. Either condition will prevent the print job from printing properly. Thus, the error message may request that the user clear a blockage from the output door 104 and/or remove paper from the output bin 102.

After the error message is displayed, the method 400 returns to block 408 to determine whether user action has resolved the condition. The method 400 may loop through blocks 408 and 412 until the detector 114 receives a signal from the emitter 112, and the method 400 can proceed to block 410.

Once the printing device controller 130 has issued the command to start the print job, the method 400 proceeds to block 414. In block 414, the printing device controller 130 monitors the sensor 108 to ensure that the detector 114 continues to receive a signal from the emitter 112.

In block 416, the printing device controller 130 determines whether the detector 114 of the sensor 108 has gone more than a threshold continuous period of time without receiving a signal from the emitter 112. In one example, the threshold continuous period of time is ten seconds. In another example of block 416, the printing device controller 130 may instead determine whether at least a threshold number of pages has been printed without receiving a signal from the emitter 112. If the detector 114 has not detected a signal from the emitter 112 for more than the threshold continuous period of time, then this could mean that the output bin 102 is full and may need to be emptied.

If the printing device controller 130 concludes that the detector 114 is receiving a signal from the emitter 112, or if the threshold continuous period of time has not passed without the detector 114 receiving a signal, then the method 400 proceeds to block 424. In block 424, the printing device controller 130 determines whether the print job is complete.

If the printing device controller 130 concludes in block 424 that the print job is not complete, then the method 400 returns to block 414 and proceeds as described above. However, if the printing device controller 130 concludes in block 424 that the print job is complete, then the method 400 ends in block 426. In a further example, if the print job is determined to be complete and the output bin 102 is determined to be full, then the printing device controller 130 will display an error message to the user, e.g., on a display of the printing device 100, requesting that the user clear the output bin 102 before a next print job can commence. Once the method 400 ends, the printing device controller 130 may issue a command to close the output door 104.

Referring back to block 416, if the printing device controller 130 concludes that the detector 114 has not detected a signal from the emitter 112 for more than the threshold period of time, then the method 400 proceeds to block 418. In block 418, the printing device controller 130 displays an error message to the user, e.g., on a display of the printing device 100, and also issues a command to pause the print job. The error message may request that the user remove paper from the output bin 102. In one example, when the output bin is determined to be full (or achieves a threshold fullness, such as nearly full), the printing device controller 130 may allow up to a fixed number of additional pages to be printed before pausing the print job. The fixed number of pages may depend on the size of the output bin 102 and in one example may be thirty pages. If the fixed number of additional pages is printed, and the print job is still not complete, then the printing device controller 130 will pause the print job and output a signal, e.g., via a display of the printing device, requesting that the user clear the output bin 102.

In block 420, the printing device controller 130 determines whether the detector 114 is receiving a signal from the emitter 112 again. If the detector 114 is receiving a signal again, this may indicate that the user has emptied the output bin 102.

Thus, if the printing device controller 130 concludes in block 420 that the detector 114 is receiving a signal from the emitter 112 again, then the method 400 proceeds to block 422 and issues a command to resume the print job. The method 400 then returns to block 414 and proceeds as described above.

Otherwise, if the printing device controller concludes in block 420 that the detector 114 is still not receiving a signal from the emitter 112, then the method 400 returns to block 418 and proceeds as described above until the detector 114 begins receiving a signal again.

Figure 5:
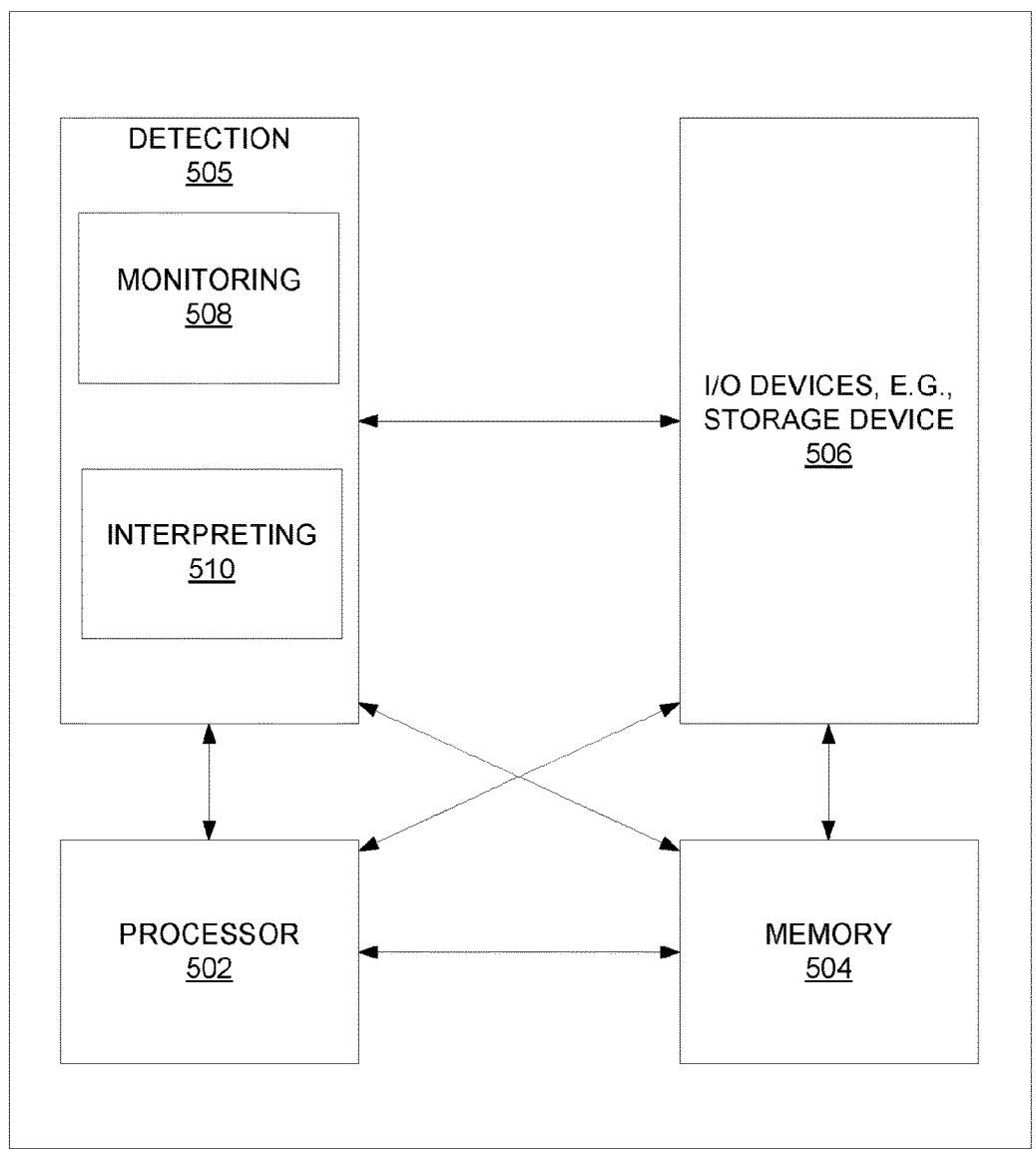
FIG. 5 depicts a high-level block diagram of an example computing device suitable for use in performing the functions described herein.

FIG. 5 depicts a high-level block diagram of a computing device suitable for use in performing the functions described herein. As depicted in FIG. 5, the computing device 500 comprises a hardware processor element 502, e.g., a central processing unit (CPU), a microprocessor, or a multi-core processor, a memory 504, e.g., random access memory (RAM), a module 505 for detecting full output bin and blocked output door conditions, and various input/output devices 506, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the computer may employ a plurality of processor elements. Furthermore, although one computer is shown in the figure, if the method(s) as discussed above is implemented in a distributed or parallel manner for a particular illustrative example, i.e., the blocks of the above method(s) or the entire method(s) are implemented across multiple or parallel computers, then the general-purpose computer of this figure is intended to represent each of those multiple general-purpose computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 505 for detecting full output bin and blocked output door conditions, e.g., machine readable instructions, can be loaded into memory 504 and executed by hardware processor element 502 to implement the blocks, functions, or operations as discussed above in connection with the example methods 300 and 400. In this case, the module 505 for detecting full output bin and blocked output door conditions may include code components or instructions, including instructions 508 and 510 for monitoring the sensor and interpreting the printing device condition when the sensor's detector is not detecting a signal. Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 505 for detecting full output bin and blocked output door conditions, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical device or devices that provide the ability to store information such as data and/or instructions to be accessed by a processor or a computing device such as a computer or an application server.

FIGS. 1A-4 illustrate an example of the disclosure in which a mechanical arm, e.g., mechanical arm 110, includes two protrusions that define a window therebetween. However, in another example, the mechanical arm could include a single protrusion. In this case, there mechanical arm will still have at least three positions relative to the sensor's line of sight, e.g.: (1) protrusion aligned with line of sight; (2) protrusion positioned below the line of sight; and (3) protrusion positioned above the line of sight.

Figure 6A:
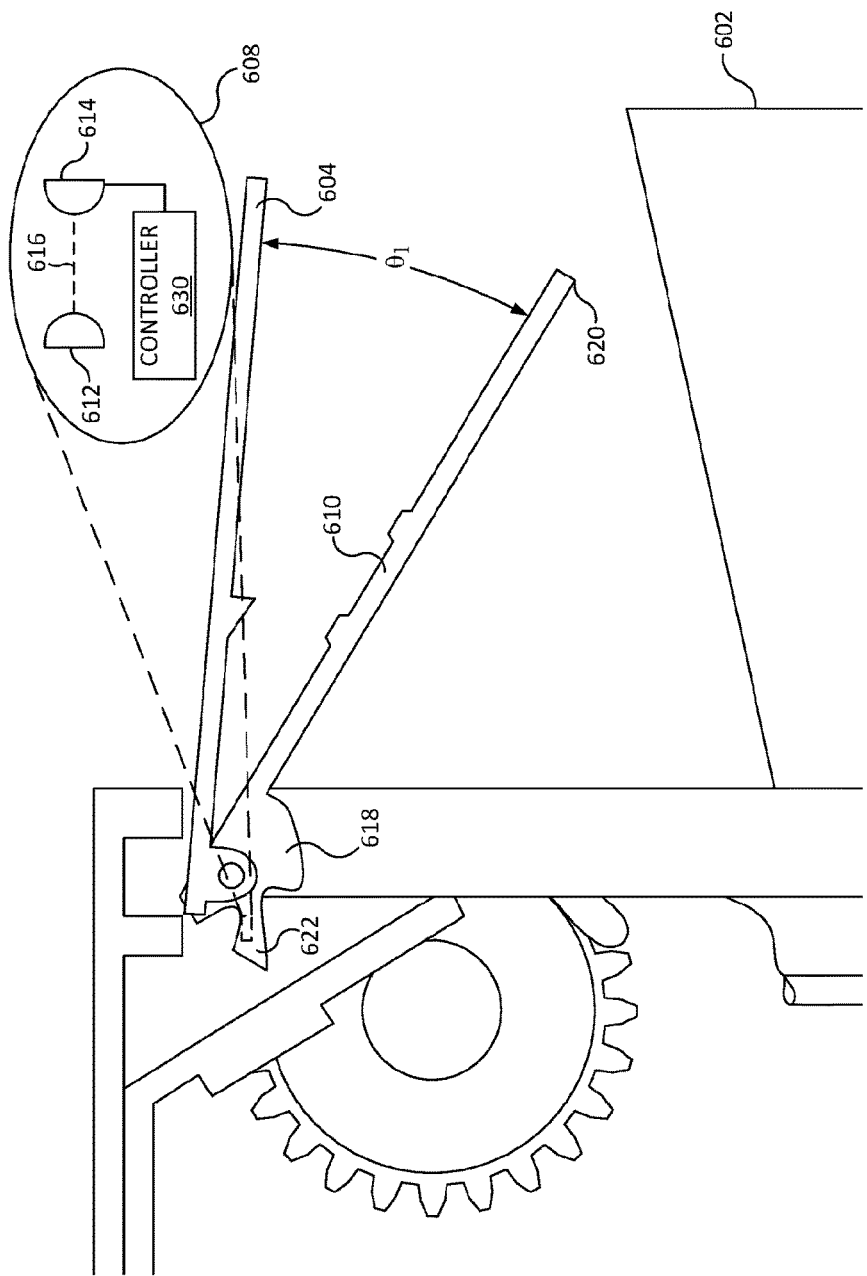
FIGS. 6A-6C illustrate a second example of a portion of a printing device that incorporates a sensor assembly for detecting when the output bin of the printing device is full and also when the output door of the printing device is closed.
Figure 6B:
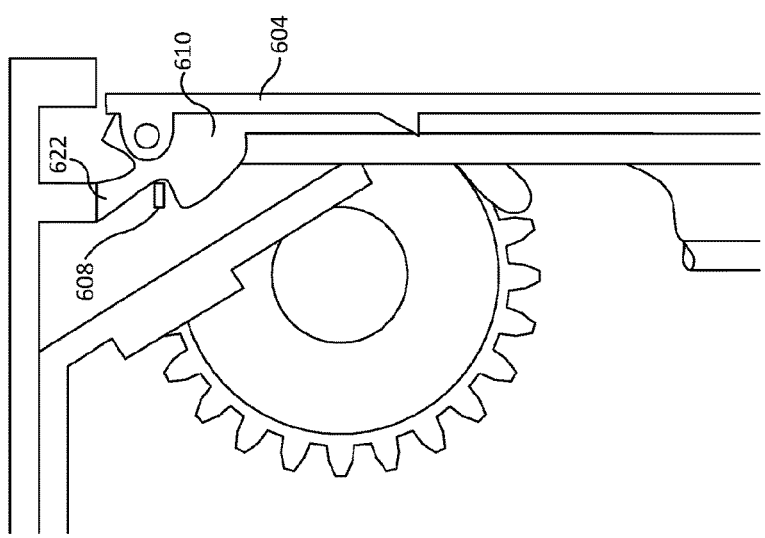
Figure 6C:
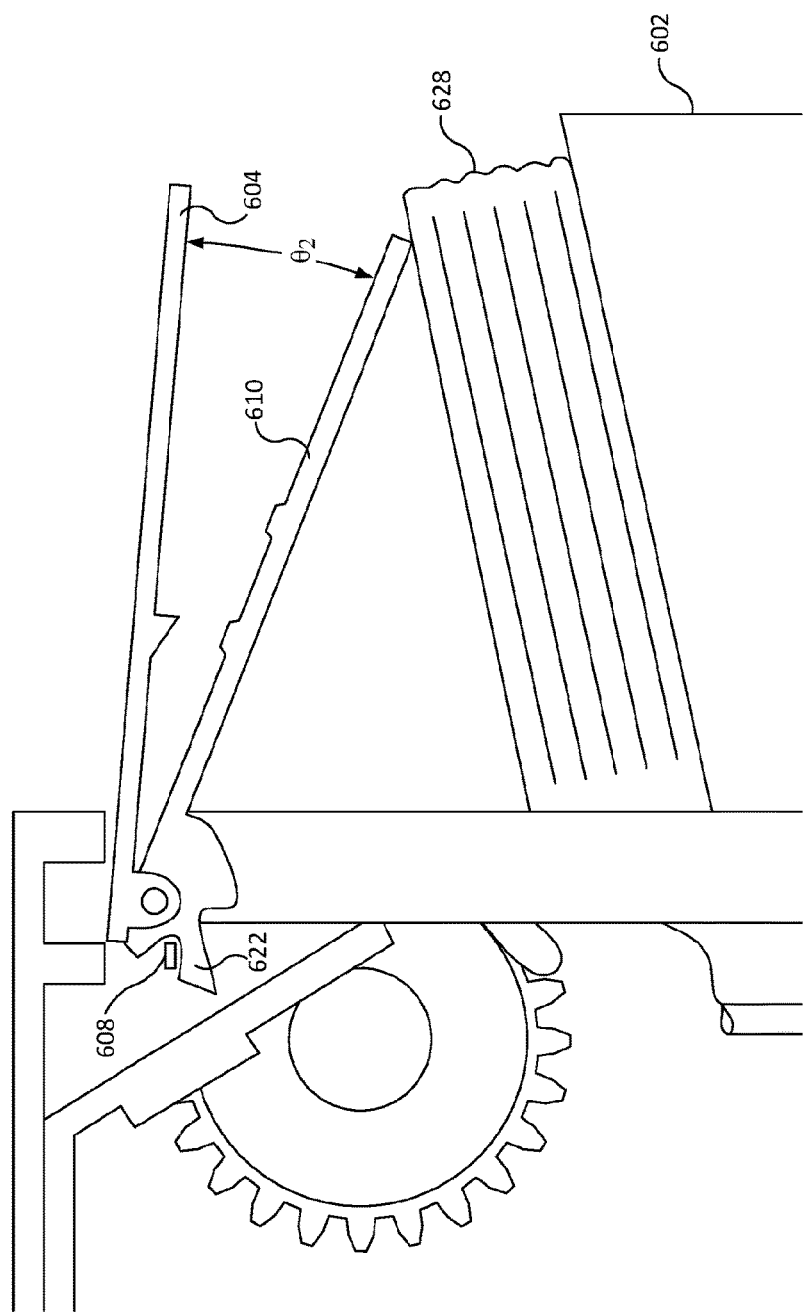

FIGS. 6A-6C, for example, illustrate a second example of a portion of a printing device 600 that incorporates a sensor assembly for detecting when the output bin of the printing device 600 is full and also when the output door of the printing device 600 is closed. In particular, FIG. 6A illustrates the printing device 600 when the output door is open and the output bin is not full; FIG. 6B illustrates the printing device 600 when the output door is blocked, and FIG. 6C illustrates the printing device 600 when the output bin is full. The figures illustrate portions of the printing device 600 that are relevant to an understanding of the present disclosure and are not meant to depict the printing device 600 in full.

As illustrated in FIG. 6A, the printing device 600 includes an output bin 602 and output door 604. The output bin 602 is mounted to the exterior of the printing device 600 and is positioned to catch paper as it exits the printing device 600. The output door 604 is hinged upon a first axis of rotation that is substantially perpendicular to the direction in which paper exits the printing device 600, e.g., normal to the plane of FIG. 6A. The output door 604 may have a planar shape. When the printing device 600 is instructed to deliver a print job to the output bin 602, the output door 604 opens to allow the paper to exit the printing device 600 and accumulate in the output bin 602. The output door 604 may close once the print job is complete. However, as discussed above, the output door 604 may be blocked, e.g., due to an obstruction or mechanical failure, or the output bin 602 may be full, e.g., due to an accumulation of previous printing jobs. Either of these conditions can prevent the print job from printing properly.

To detect these conditions, in one example a single sensor 608 is deployed in conjunction with a mechanical arm 610. The sensor 608 is mounted within the interior of the printing device 600, near the axis of rotation of the output door 604. The sensor 608 includes an emitter 612 and a detector 614 that define a line of sight 616 therebetween. In one example, the line of sight 616 is substantially parallel to and is as long as at least a portion of the first axis of rotation. For instance, the emitter 612 may be positioned on one side of the output door, while the detector 614 is positioned on the other side of the output door.

The mechanical arm 610 has a fixed end 618 and a free end 620. The fixed end 618 is hinged about a second axis of rotation that is substantially parallel to the first axis of rotation and to the sensor's line of sight 616. In one example, the second axis of rotation and the first axis of rotation are collinear, e.g., such that the output door 604 and the mechanical arm 610 are hinged about the same axis.

Figure 7:
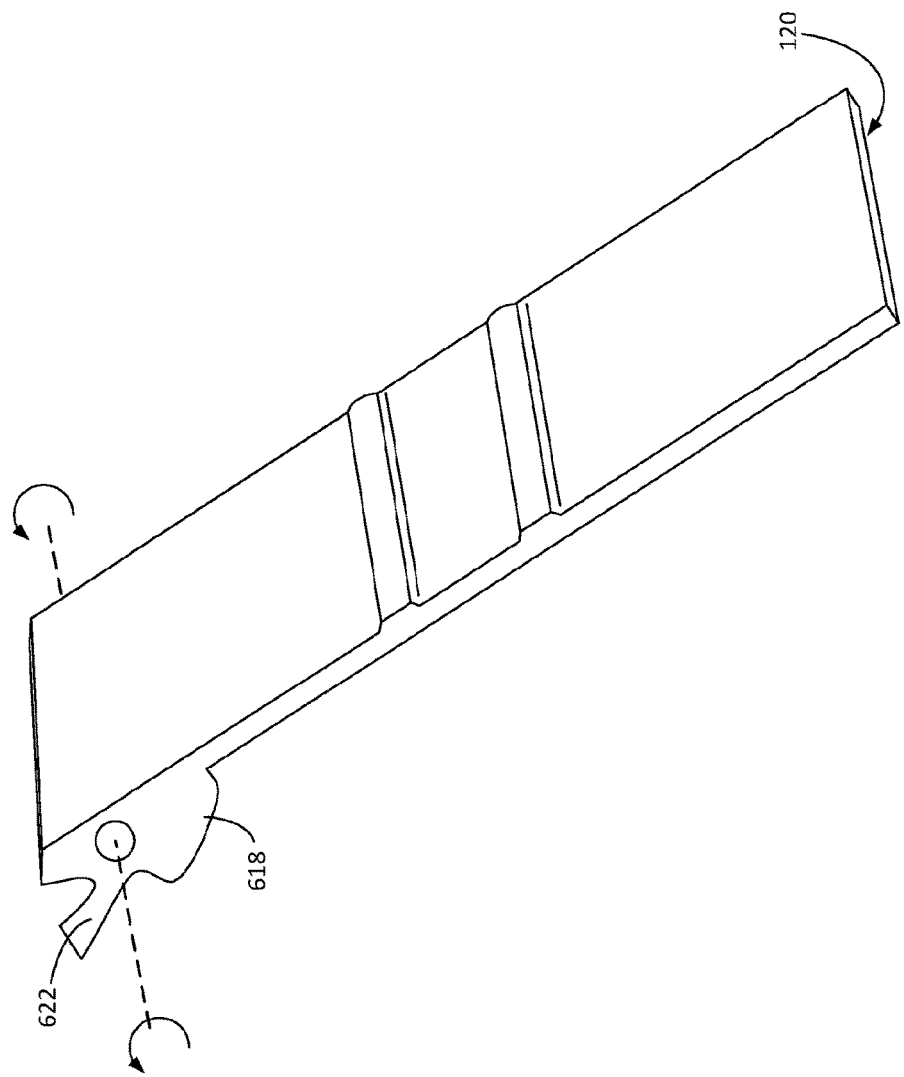
FIG. 7 illustrates the example mechanical arm of FIGS. 6A-6C in more detail.

FIG. 7 illustrates the example mechanical arm 610 of FIGS. 6A-6C in more detail. As illustrated, the mechanical arm 610 may have a substantially planar shape, e.g., similar to the output door 604 but smaller. Thus, the mechanical arm 610 may be configured as a flap that is mounted between the output door 604 and the output bin 602. The fixed end 618 of the mechanical arm 610 includes a mechanical flag. The mechanical flag is formed by a first protrusion 622.

Referring back to FIG. 6A, the mechanical arm 610 is mounted so that the first protrusion 622 extends beyond the plane of the output door 604. When the output door 604 is open and the output bin 602 is not full, i.e., the accumulation of paper in the output bin is less than the output bin's maximum capacity, the mechanical arm 610 rotates to a position that aligns the first protrusion 622 with the sensor's line of sight 616, such that the sensor's line of sight 616 is obstructed. Thus, the detector 614 is unable to detect signals emitted by the emitter 612. In this example, a "signal" may be defined as an indicator that is different from an expected indicator. For instance, a lack of signal (or a "low" signal from the emitter 612 may be expected, but an active signal (or a "high" signal) may also be considered as an indicator of a different type. As illustrated in FIG. 6A, an angle of $\theta_1$ exists between the output door 604 and the mechanical arm 610 in this case.

FIG. 6B illustrates what happens when the output door 604 is blocked or closed. In this case, the closing of the output door 604 urges the mechanical arm 610 to rotate to a position that positions the first protrusion 622 of the mechanical flag above the sensor's line of sight 616. Thus, the detector 614 is able to detect signals emitted by the emitter 612.

FIG. 6C illustrates what happens when the output bin 602 is full, i.e., when the accumulation of paper in the output bin is greater than or equal to the output bin's maximum capacity. In this case, the paper stack 628, i.e., the accumulation of completed or partially completed print jobs, in the output bin 602 urges the mechanical arm 610 to rotate to a position that positions the first protrusion 622 of the mechanical flag below the sensor's line of sight 616. Thus, the detector 614 is able to detect signals emitted by the emitter 612. As illustrated in FIG. 6C, an angle of $\theta_2$, which is smaller than the angle of $\theta_1$ in FIG. 6A, exists between the output door 604 and the mechanical arm 610 in this case, as a result of the paper stack 628 contacting the mechanical arm 610 and urging the mechanical arm 610 upward.

Figure 8:
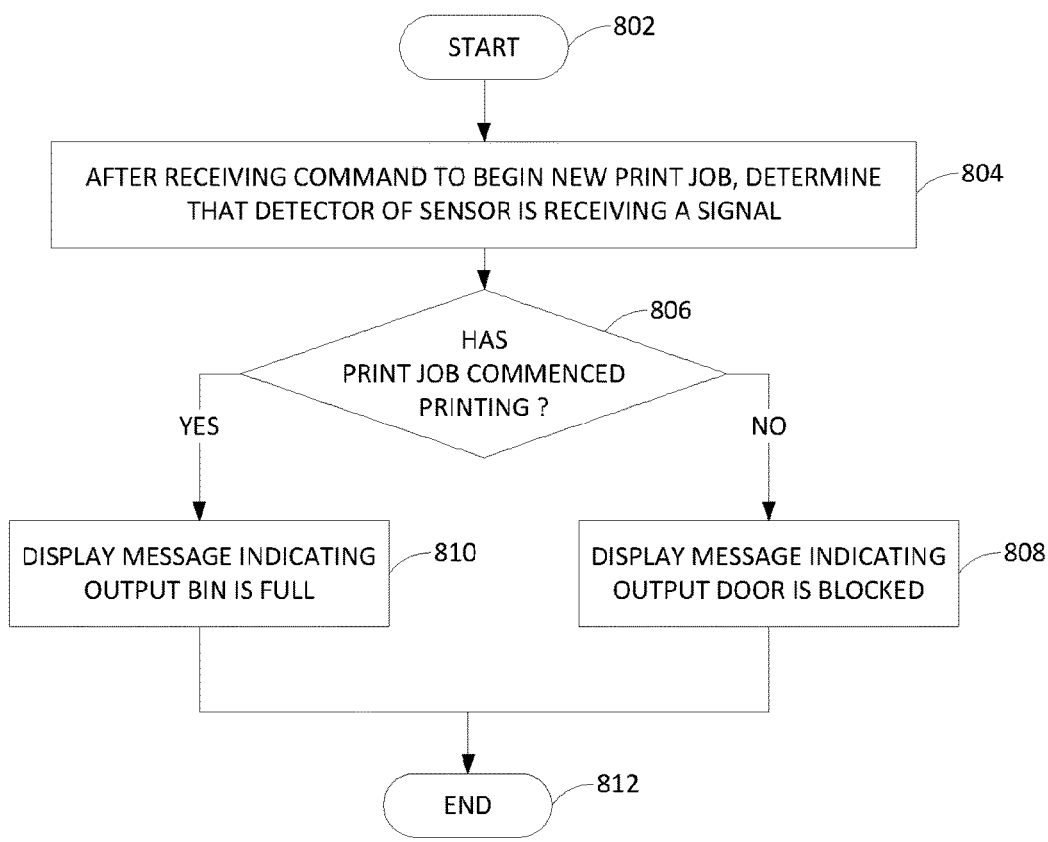
FIG. 8 illustrates a flowchart of one example method for detecting when the output bin of a printing device is full or when the output door of the printing device is closed.

FIG. 8 illustrates a flowchart of one example method 800 for detecting when the output bin of a printing device is full or when the output door of the printing device is closed. The method 800 may be performed, for example, by the controller 630 of the printing device 600 of FIGS. 6A-6C. Otherwise, or in addition, at least one of the blocks of the method 800 may be implemented by a computing device having a processor, a memory, and input/output devices as illustrated above in FIG. 5, specifically programmed to perform the blocks of the method, e.g., by operating as a control circuit for the printing device 600. Although a computing device may be specifically programmed to perform various blocks of the method 800, the method will now be described in terms of an example where blocks of the method are performed by a controller of a printing device, such as the printing device controller 630 in FIGS. 6A-6C. As such, non-limiting reference is made in the discussion of the method 800 to various components of FIGS. 6A-6C.

The method 800 begins in block 802. In block 804, after receiving a command to begin a new print job, the printing device controller 630 determines that the detector 614 of the sensor 608 is receiving a signal from the emitter 612.

In block 806, the printing device controller 630 determines whether the print job has commenced printing. If the print job has not yet commenced printing, then the printing device controller 630 concludes that the output door 604 is blocked. The printing device controller 630 then displays a message indicating that the output door 604 is blocked in block 808.

Otherwise, if the print job has commenced printing, then the printing device controller 630 concludes that the output bin 602 is full. The printing device controller 630 then displays a message indicating that the output bin 602 is full in block 810. The method 800 ends in block 812.

Thus, the method 800 is able to determine, using a single sensor 608 in conjunction with the mechanical arm 610, when the output door 604 is blocked and also when the output bin 602 is full. That is, both conditions can be detected using the same sensor, rather than relying on separate sensors to detect each condition. This, for example, minimizes the number of components that are installed inside the printing device 600, where space may be very limited.

Figure 9:
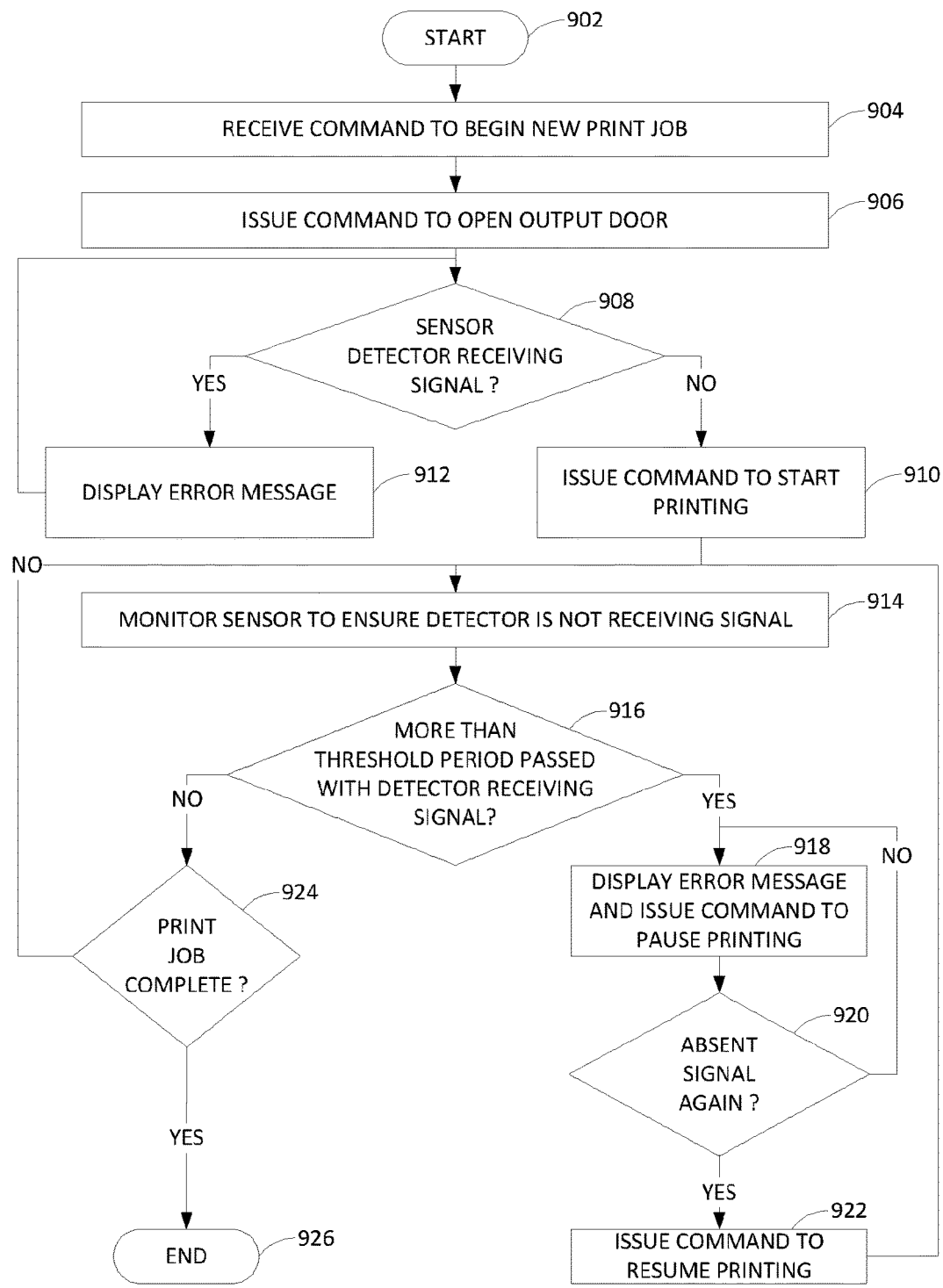
FIG. 9 illustrates a flowchart of another example method for detecting when the output bin of a printing device is full or when the output door of the printing device is closed.

FIG. 9 illustrates a flowchart of another example method 900 for detecting when the output bin of a printing device is full or when the output door of the printing device is closed.

The method 900 is a more detailed version of the method 800 illustrated in FIG. 8. The method 900 may be performed, for example, by the controller of the printing device 600 of FIGS. 6A-6C. Otherwise, or in addition, at least one of the blocks of the method 900 may be implemented by a computing device having a processor, a memory, and input/output devices as illustrated above in FIG. 5, specifically programmed to perform the blocks of the method, e.g., by operating as a control circuit for the printing device 600. Although a computing device may be specifically programmed to perform various blocks of the method 900, the method will now be described in terms of an example where blocks of the method are performed by a controller of a printing device, such as the printing device controller 630 in FIGS. 6A-6C. As such, non-limiting reference is made in the discussion of the method 900 to various components of FIGS. 6A-6C.

The method 900 begins in block 902. In block 904, the printing device controller 630 receives a command, e.g., from a user, to begin a new printing job. Prior to receiving this command, the output door 604 of the printing device 600 may have been closed due to the printing device being idle. In this case, the detector 614 of the sensor 608 would be receiving a signal from the emitter 612.

In block 906, the printing device controller 630 issues a command to open the output door 604.

In block 908, the printing device controller 630 confirms whether the detector 614 of the sensor 608 is receiving a signal from the emitter 612. If the detector 614 is not receiving the signal from the emitter 612, then this indicates that the output door 604 is open. Thus, if the printing device controller 630 concludes in block 908 that the detector 614 is not receiving a signal, then the printing device controller 630 issues a command to start the printing in block 910.

However, if the printing device controller 630 concludes in block 908 that the detector 614 is receiving a signal, then in block 912, the printing device controller 630 displays an error message to the user, e.g., on a display of the printer. The ability of the detector 614 to receive the signal can mean that either the output door 604 is blocked or that the output door 604 is open, but the output bin 602 is full. Either condition will prevent the print job from printing properly. Thus, the error message may request that the user clear a blockage from the output door 604 and/or remove paper from the output bin 602.

After the error message is displayed, the method 900 returns to block 908 to determine whether user action has resolved the condition. The method 900 may loop through blocks 908 and 912 until the detector 614 no longer receives a signal from the emitter 612, and the method 900 can proceed to block 910.

Once the printing device controller 630 has issued the command to start the print job, the method 900 proceeds to block 914. In block 914, the printing device controller 630 monitors the sensor 608 to ensure that the detector 614 continues to receive no signal from the emitter 612.

In block 916, the printing device controller 630 determines whether the detector 614 of the sensor 608 has gone more than a threshold continuous period of time receiving a signal from the emitter 612. In one example, the threshold continuous period of time is ten seconds. In another example of block 916, the printing device controller 630 may instead determine whether at least a threshold number of pages has been printed while a signal is received from the emitter 612. If the detector 614 has detected a signal from the emitter 612 for more than the threshold continuous period of time, then this could mean that the output bin 602 is full and may need to be emptied.

If the printing device controller 630 concludes that the detector 614 is not receiving a signal from the emitter 612, or if the threshold continuous period of time has not passed with the detector 614 receiving a signal, then the method 900 proceeds to block 924. In block 924, the printing device controller 630 determines whether the print job is complete.

If the printing device controller 630 concludes in block 924 that the print job is not complete, then the method 900 returns to block 914 and proceeds as described above. However, if the printing device controller 630 concludes in block 924 that the print job is complete, then the method 900 ends in block 926. In a further example, if the print job is determined to be complete and the output bin 602 is determined to be full, then the printing device controller 630 will display an error message to the user, e.g., on a display of the printing device 600, requesting that the user clear the output bin 602 before a next print job can commence. Once the method 900 ends, the printing device controller 630 may issue a command to close the output door 604.

Referring back to block 916, if the printing device controller 630 concludes that the detector 614 has detected a signal from the emitter 612 for more than the threshold period of time, then the method 900 proceeds to block 918. In block 918, the printing device controller 630 displays an error message to the user, e.g., on a display of the printing device 100, and also issues a command to pause the print job. The error message may request that the user remove paper from the output bin 602. In one example, when the output bin is determined to be full (or achieves a threshold fullness, such as nearly full), the printing device controller 630 may allow up to a fixed number of additional pages to be printed before pausing the print job. The fixed number of pages may depend on the size of the output bin 602 and in one example may be thirty pages. If the fixed number of additional pages is printed, and the print job is still not complete, then the printing device controller 630 will pause the print job and output a signal, e.g., via a display of the printing device 600, requesting that the user clear the output bin 602.

In block 920, the printing device controller 630 determines whether a signal from the emitter 612 is absent, e.g., whether or not the detector 614 is receiving a signal from the emitter 612. If the signal is absent, this may indicate that the user has emptied the output bin 602.

Thus, if the printing device controller 630 concludes in block 920 that the signal from the emitter 612 is absent, then the method 900 proceeds to block 922 and issues a command to resume the print job. The method 900 then returns to block 914 and proceeds as described above.

Otherwise, if the printing device controller concludes in block 920 that the signal is not absent, i.e., that the detector 614 is still receiving a signal from the emitter 612, then the method 900 returns to block 918 and proceeds as described above until the detector 614 stops receiving the signal.

It will be appreciated that variants of the above-disclosed and other features and functions, or variations thereof, may be combined into many other different systems or applications. Various presently unforeseen or unanticipated variations, modifications, or variations therein may be subsequently made, which are also intended to be encompassed by the following claims.

What is claimed is:

1. A printing device, comprising:
   a sensor including an emitter and a detector that define a line of sight therebetween;
   a mechanical arm having a fixed end, a free end, and a first axis of rotation passing through the fixed end that is parallel to the line of sight;
   a mechanical flag mounted to the fixed end of the mechanical arm and including at least a first protrusion that defines at least three positions of the mechanical arm relative to the line of sight; and
   an output door hinged upon a second axis of rotation that is substantially perpendicular to a direction in which a paper exits the printing device, wherein the second axis of rotation is parallel to the first axis of rotation.

2. The printing device of claim 1, wherein the mechanical flag further comprises:
   a second protrusion; and
   a window defined between the first protrusion and the second protrusion.

3. The printing device of claim 1, wherein the first axis of rotation and the second axis of rotation are collinear.

4. The printing device of claim 1, further comprising:
   an output bin positioned to catch the paper as the paper exits the printing device, wherein the mechanical arm is positioned between the output door and the output bin.

5. A method, comprising:
   after receiving a command to begin a print job, monitoring a signal transmitted between an emitter and a detector of a sensor mounted within a printing device;
   determining, based on the signal being detected in a first state, that an output bin of the printing device is full, when the first state is detected after the print job has commenced; and
   determining, based on the signal being detected in the first state, that an output door of the printing device is blocked, when the first state is before the print job has commenced.

6. The method of claim 5, wherein the first state is a low signal.

7. The method of claim 5, wherein the first state is a high signal.

8. The method of claim 5, further comprising:
   determining, based on the signal being detected in a second state that is different from the first state, that the output door is open and the output bin is not full.

9. The method of claim 5, wherein the determining that the output bin is full occurs after the first state is detected for longer than a threshold continuous period of time.

10. The method of claim 5, wherein the determining that the output bin is full occurs after at least a threshold number of pages of the print job have printed during a continuous detection of the first state.

11. The method of claim 5, further comprising:
    after determining that the output bin is full, allowing up to a fixed number of additional pages of the print job to print.

12. A non-transitory machine-readable storage medium encoded with instructions executable by a processor, the machine-readable storage medium comprising:
    instructions to monitor a signal transmitted from an emitter of a sensor mounted in a printing device to a detector of the sensor;
    instructions to determine, based on the signal being detected in a first state, that an output door of the printing device is blocked, when the first state is detected after a command to begin a print job is received but before the print job has commenced; and instructions to determine, based on the signal being detected in the first state, that an output bin of the printing device is full, when the first state is detected after the print job has commenced.

13. The non-transitory machine-readable storage medium of claim 12, further comprising:
instructions to allow up to a fixed number of additional pages of the print job to continue after determining that the output bin is full.

* * * * *